United States Patent [19]
Dell Orfano

[11] 4,089,032
[45] May 9, 1978

[54] PLUG-TYPE TRANSIENT SURGE SUPPRESSOR

[76] Inventor: William Dell Orfano, 6 Villa St., Chelsea, Mass. 02150

[21] Appl. No.: 721,196

[22] Filed: Sep. 8, 1976

[51] Int. Cl.² ............................................. H02H 9/04
[52] U.S. Cl. ..................................... 361/56; 361/111
[58] Field of Search ............... 361/54, 55, 56, 111; 338/20, 21, 220; 340/248 C, 250, 252 R; 339/14 P, 147 P

[56] References Cited

U.S. PATENT DOCUMENTS

| | | | |
|---|---|---|---|
| 3,821,686 | 6/1974 | Harnden, Jr. | 338/21 |
| 3,840,781 | 10/1974 | Brown | 361/58 |

FOREIGN PATENT DOCUMENTS 2,259,530   6/1973   Germany .............................. 361/56

*Primary Examiner*—Harry E. Moose, Jr.
*Attorney, Agent, or Firm*—Morse, Altman, Oates & Bello

[57] ABSTRACT

A compact molded case containing an epoxied surge suppressor circuit with extending male prongs and female sockets for interconnection between a wall outlet and a power cord for electronic equipment. The suppressor circuit has a varistor network and associated pico fuses for transient surge suppression. An indicator connected to the suppressor circuit provides an indication of circuit status.

9 Claims, 4 Drawing Figures

PLUG-TYPE TRANSIENT SURGE SUPPRESSOR

BACKGROUND OF THE INVENTION

1. Field of Invention

The present invention relates to voltage sensing devices and, more particularly, is directed towards plug-type transient surge suppressors.

2. Description of the Prior Art

It is desirable to protect electronic equipment against premature failure caused by transient surges. A variety of devices have been designed to sense voltage mangitude and to suppress transients above a predetermined level. Generally, such devices are complex in construction and costly to manufacture. A need has arisen for a transient surge suppressor that is compact, relatively low in cost and simple in construction.

SUMMARY OF THE INVENTION

It is an object of the present invention to provide a relatively inexpensive and compact transient surge suppressor device having a high degree of reliable operational characteristics.

It is another object of the invention to provide a compact plug-type transient surge suppressor that is configured to be inserted between a wall outlet and a male plug on a power cord connected to electronic equipment. The transient surge suppressor device of the present invention is characterized by a compact molded case that engulfs an epoxied surge suppression circuit. Male prongs and female sockets that are interconnected with the suppressor circuitry and are fixed within the epoxy compound extend from opposite faces of the molded case. The suppressor circuitry includes a varistor network which constitutes a non-linear resistance that decreases as voltage increases for shunting a load component in the presence of voltage surges above a predetermined magnitude. Pico fuses are provided for isolating the varistor network in the event of massive transient surges that exceed the operational limits of the varistor network. An indicator connected to the suppressor circuitry provides an indication of circuit status.

It is another object of the present invention to provide a method of fabricating a transient surge suppressor having a molded casing by potting suppressor circuitry in a room temperature cured epoxy and then molding a plastic casing about the potted circuitry.

Other objects of the present invention will in part be obvious and will in part appear hereinafter.

The invention accordingly comprises the apparatuses and methods, together with their parts, steps, elements and interrelationships that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein.

DETAILED DESCRIPTION OF THE PREFERRED EMBODIMENTS

Figure 1:
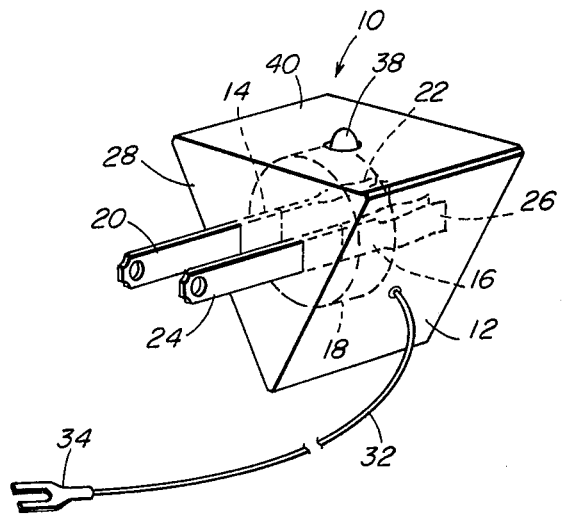
FIG. 1 is a perspective view of the male end of a plug-type transient surge suppressor device embodying the present invention.
Figure 2:
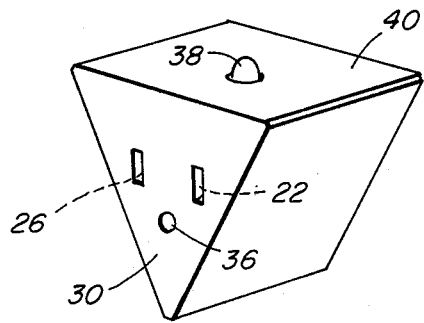
FIG. 2 is a perspective view of the plug-type transient surge suppressor device of FIG. 1 showing the female end.

Referring now to the drawings, particularly FIG. 1, there is shown a plug-type transient surge suppressor device 10 embodying the invention. Transient surge suppressor device 10 is configured to be interconnected between a wall outlet connected to a power source and a male plug on a line cord connected to electronic equipment. Surge suppressor 10 comprises a molded casing 12 having a substantially triangular profile in right cross section. A pair of elongated contact members 14 and 16, which are fixed within an epoxied body 18, are exposed at opposite faces of casing 12. Elongated contact member 14 includes a male prong portion 20 and a female socket portion 22. Elongated contact member 16 includes a male prong portion 24 and a female socket portion 26. Male prongs 20, 24 extend from a forward face 28 of casing 12 and female sockets 22, 26 are exposed at a rearward face 30 of the casing. A ground wire 32 with a terminal 34 extends from a side face of casing 12. A ground socket 36, which is connected to ground wire 32, is exposed at rearward face 30. An indicator 38, for example a light emitting diode, extends from an upper face 40 of casing 12. In the illustrated embodiment, casing 12 is composed of a plastic such as polyvinyl chloride.

Figure 3:
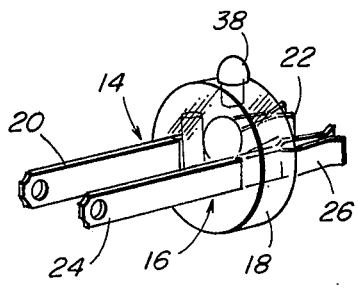
FIG. 3 is a perspective view of the potted suppressor circuitry of the device of FIGS. 1 and 2.

As shown in FIG. 3, elongated contact members 14 and 16 are held in fixed spaced relationship to one another within body 18 which is composed of a room temperature cured epoxy having low thermal conductivity such as that sold by Hardman Incorporated of Belleville, N.J., under the trade designation EP-2305 LK. Contact members 14 and 16 are positioned relative to one another so that male prongs 20 and 24 can be plugged into a wall outlet and a male plug on the end of a line cord can be inserted into female sockets 22 and 26. Transient surge suppressor circuit elements 42, now to be described, are contained within epoxy body 18 and are interconnected with contact members 14, 16 which constitute a pair of electrical conductors.

Figure 4:
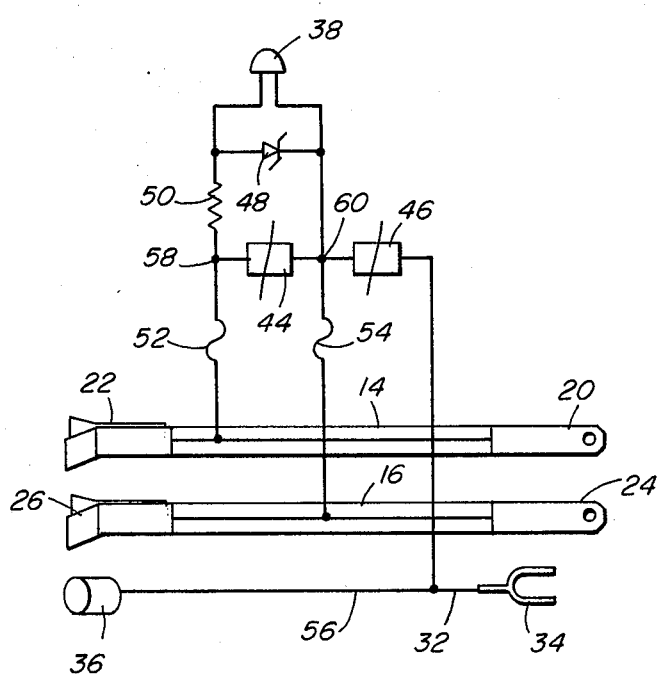
FIG. 4 is a schematic diagram of the suppressor circuitry.

Referring now to FIG. 4, it will be seen that the transient surge suppressor circuitry 42 includes a pair of voltage dependent, non-linear resistive elements 44, 46 having symmetrical conductive properties, a zener diode 48, a linear resistive element 50, a pair of fuse elements 52, 54 and indicator 38. In the illustrated embodiment, voltage dependent, non-linear resistive elements 44 and 46 are metal oxide varistors which conduct above a set recurrent peak applied voltage such as 184 volts AC with RMS applied voltage set at 130 volts AC. Varistor 44 is connected in parallel across contact members 14 and 16, and varistor 46 is connected in parallel across contact member 16 and a ground lead 56 which connects ground socket 36 and ground wire 32. When transient surge suppressor device 10 is inserted into a wall outlet, 115V–130V volts AC is present across contact members 14 and 16. Fuse element 52, a pico fuse, is connected in series between one side of varistor 44 and contact member 14, the junction of varistor 44 and pico fuse 52 being denoted by reference character 58. Fuse element 54, a pico fuse, is connected in series between the other side of varistor 44 and contact member 16, the junction of varistor 44 and pico fuse 54 being denoted by reference character 60. Varistor 46 is connected between junction 60 and ground lead 56. Linear resistive element 50, a resistor, is connected between junction 58 and the anode of zener diode 48. The cathode of zener diode 48 is connected to junction 60. Indicator 38, a light emitting diode, is connected across zener diode 48.

Pico fuses 52 and 54, which are rated at 1.5 amp fuses with applied voltage of 125V, are operative to isolate varistors 44 and 46 from the line voltage in the event of a massive transient surge that would render the varistors into the breakdown zone and unreliable. As previously indicated, varistors 44 and 46 are rated at 130 volts having a peak recurrent voltage of 184 volts, transient dissipation 2 Joules, .24 watts and peak current of 200 amperes $t_p$20 microseconds. Pico fuses 52 and 54 are rated for 4 hours at 100%, 5 seconds at 200% and 200 amperes at 25 microseconds. Light emitting diode 38 is provided to monitor the status of pico fuses 52, 54. When either or both of pico fuses 52 and 54 are blown, light emitting diode 38 is off. Resistor 50, for example a 75 K ohm resistor, is provided for limiting the emitting diode 38 current to the range of 16-20 milliamperes. Zener diode 48 is a 6 volt zener diode.

Transient surge suppressor device 12 is used by inserting male prongs 20 and 24 into a wall outlet. A line plug connected to electronic equipment to be protected is inserted into female sockets 22 and 26. Varistors 44 and 46 conduct above a set recurrent peak applied voltage such as 184 volts AC with RMS applied voltage set at 130 volts AC. The operational characteristics of varistors 44 and 46 is that of spaced charged limited currents. When the initial injected carrier density is less than the thermally generated free carrier density, the current-voltage characteristic is ohmic. When the injected carrier density exceeds the thermally generated free carrier density, the current becomes space charge limited and takes the form of the Mott-Gurney square law. The current rises rapidly until it reaches the trap free charge limited value. In other words, the resistance of the varistor drops as the applied voltage is increased. In the presence of transient surges, the resistances of varistors 44 and 46 decrease and are operative to shunt the load in a protective manner to prevent premature failure of the electronic equipment.

As previously indicated, plug-type transient surge suppressor device 10 is in the form of molded casing 12 having a substantially triangular profile in right cross section. In the illustrated embodiment, the edges of forward face 28 and rearward face 30 of casing 12 are each approximately 3.5 cm and the depth of casing 12 is approximately 3.0 cm.

The steps of fabricating transient surge suppressor device 10 are now presented. First, contact members 14, 16 and suppressor circuitry 42 are set and potted in a polyethylene potting mold using a room temperature cured epoxy such as that sold by Hardman Incorporated of Belleville, N.J. under the trade designation EP-2305 LK. Upon completion of curing, the potted assembly is removed from the potting mold and placed into an encasing mold. Next, polyvinyl chloride at a temperature of 350° is injected into the encasing mold and encapsulates the epoxied circuitry 42 and contact members 14, 16. Finally, the molded casing 12 encapsulating suppressor circuitry 42, indicator 38 extending through an opening 62 formed in face 40, is removed from the encasing mold. The room temperature cured epoxy is operative to protect suppressor circuitry 42 from the thermal shock of 350° F during the molding of polyvinyl chloride casing 12. This method of manufacture is designed to prevent such a thermal shock from rendering the components of suppressor circuitry 42 unreliable and/or defective.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A transient surge suppressor comprising:
   (a) transient surge suppressor circuitry means;
   (b) a potted body containing at least portions of said transient surge suppressor circuitry;
   (c) a pair of male contact means connected to said transient surge supperssor and fixed to said potted body;
   (d) a pair of female contact means connected to said transient surge suppressor and fixed to said potted body, one of each said female contact means connected to one of each said male contact means;
   (e) ground means connected to said transient surge suppressor circuitry;
   (f) a casing molded about said potted body, said male contact means extending from said casing, said female contact means and said ground means accessible at a face of said casing;
   (g) said transient surge suppressor circuitry including a pair of non-linear resistive elements having symmetrical conductive properties, a pair of fuse elements and indicator means, one of said fuse elements connected between one of said male contact means and one side of one of said resistive elements, the other of said fuse elements connected between the other of said male contact means and the other side of said one resistive element, one side of the other resistive element connected to the other side of said one resistive element, the other side of said other resistive element connected to said ground means, said indicator means connected across said one resistive element.

2. The transient surge suppressor as claimed in claim 1 wherein said potted body is composed of a room temperature cured epoxy having low thermal conductivity properties.

3. The transient surge suppressor as claimed in claim 1 wherein each said male contact means includes a pair of male prongs and said each female contact means includes a pair of female sockets, one of said male prongs connected to one of said female sockets, the other of said male prongs connected to the other of said female sockets.

4. The transient surge suppressor as claimed in claim 3 wherein said ground means includes a ground socket and a ground wire having a terminal at one end, said ground socket connected to said ground wire.

5. The transient surge suppressor as claimed in claim 3 wherein said ground means includes a ground socket, said male prongs extending from one face of said casing, said female sockets and said ground socket accessible to another face of said casing.

6. A transient surge suppressor device configured to be inserted into a wall outlet and interconnected with a line cord having a male plug, said device comprising:
   (a) transient surge suppressor circuitry means including a pair of varistors, a pair of pico fuses, a resistor, a zener diode and a light emitting diode;

(b) a potted body encapsulating said varistors, said pico fuses, said resistor, said zener diode and at least a portion of said light emitting diode;

(c) first and second contact members fixed to said potted body, each said contact member having a first end portion constituting a male prong and a second end portion constituting a female socket, said male prongs configured to be received within said wall outlet, said female sockets configured to receive said male plug;

(d) a casing molded about said potted body, said male prongs extending from said casing, said female sockets accessible at a face of said casing; and (e) ground means connected to said transient surge suppressore circuitry;

(f) one side of one of said pico fuses connected to said first contact member, one side of the other of said pico fuses connected to said second contact member, one side of one of said varistors connected to the other side of said one pico fuse, the other side of said one varistor connected to the other side of said other pico fuse and one side of the other of said varistors, the other side of said other varistor connected to said ground means, said resistor connected between said other side of said one pico fuse and the anode of said zener diode, the cathode of said zener diode connected to said other side of said one varistor, said light emitting diode connected across said zener diode.

7. The transient surge suppressor device as claimed in claim 6 wherein said potted body is composed of a room temperature cured epoxy having low thermal conductivity properties and said molded case is composed of polyvinyl chloride.

8. A transient surge suppressor comprising:
(a) transient surge suppressor circuitry means;
(b) a potted body containing at least portions of said transient surge suppressor circuitry;
(c) male contact means connected to said transient surge suppressor and fixed to said potted body;
(d) female contact means connected to said transient surge suppressor and fixed to said potted body, said female contact means connected to said male contact means;
(e) a casing molded about said potted body, said male contact means extending from said casing, said female contact means accessible at a face of said casing;
(f) said male contact means including a pair of male prongs and said female contact means includes a pair of female sockets, one of said male prongs connected to one of said female sockets, the other of said male prongs connected to the other of said female sockets; and (g) a ground socket, said male prongs extending from one face of said casing, said female socket and said ground socket accessible at another face of said casing;

(h) said surge suppressor circuitry means including a pair of voltage dependent, non-linear resistive elements having symmetrical conductive properties, a pair of fuse elements and indicator means, said non-linear resistive element, said fuse elements and at least a portion of said indicating means contained within said potted body, one of said non-linear resistive elements connected between said one male prong, said one female socket and said other male prong, said other female socket, the other of said non-linear resistive elements connected between said other male prong, said other female socket and said ground socket, one of said fuse elements connected in series between said one male prong, said one female socket and one side of said one non-linear resistive element, the other of said fuse elements connected in series between said other male prong, said other female socket and another side of said one non-linear resistive element, said indicator means connected across said one non-linear resistive element.

9. A transient surge suppressor comprising:
(a) first and second contact means;
(b) ground means;
(c) first and second voltage dependent, non-linear resistive element means;
(d) first and second interruption means, said first interruption means connected between said first contact means and one side of said first resistive element means, said second interruption means connected between said second contact means and the other side of said first resistive element means, said second resistive element means connected between said other side of said first resistive element means and said ground means, each of said first and said second interruption means having closed and opened states, a first electrical path established between said first contact means and said one side of said first resistive element means when said first interruption means is in its closed state, a second electrical path established between said second contact means and said other side of said first resistive element means when said second interruption means is in its closed state, said first electrical path broken when said first interruption means is in its opened state, said second electrical path broken when said second interruption means is in its opened state; and
(e) indicator means connected across said first resistive element means.

* * * * *